(12) United States Patent
Shibata et al.

(10) Patent No.: US 7,691,510 B2
(45) Date of Patent: Apr. 6, 2010

(54) FUEL CELL SYSTEM WITH DIFFERENTIAL PRESSURE CONTROL

(75) Inventors: Soichi Shibata, Hirakata (JP); Takayuki Urata, Kawabe-gun (JP); Yasushi Sugawara, Higashiosaka (JP); Takahiro Umeda, Nara (JP); Junji Morita, Moriguchi (JP); Kazuhito Hatoh, Osaka (JP); Yukinobu Kitano, Hirakata (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 10/564,469

(22) PCT Filed: Jan. 19, 2005

(86) PCT No.: PCT/JP2005/000559
§ 371 (c)(1),
(2), (4) Date: Jan. 13, 2006

(87) PCT Pub. No.: WO2005/071781
PCT Pub. Date: Aug. 4, 2005

(65) Prior Publication Data
US 2007/0292728 A1 Dec. 20, 2007

(30) Foreign Application Priority Data
Jan. 21, 2004 (JP) ............................. 2004-013107

(51) Int. Cl.
*H01M 8/04* (2006.01)
*H01M 2/00* (2006.01)
*H01M 8/00* (2006.01)

(52) U.S. Cl. .............................. 429/25; 429/34; 429/38; 429/39; 429/13

(58) Field of Classification Search .................. 429/25, 429/34, 13, 17, 22, 23, 38–39
See application file for complete search history.

(56) References Cited

U.S. PATENT DOCUMENTS 5,059,494 A    10/1991   Vartanian et al.

(Continued)

FOREIGN PATENT DOCUMENTS

EP         0 374 636 A1      6/1990

(Continued)

OTHER PUBLICATIONS

IPDL Machine Translation and Abstract in English of JP 2002-373682.*

(Continued)

*Primary Examiner*—Dah-Wei D Yuan
*Assistant Examiner*—Claire L Rademaker
(74) *Attorney, Agent, or Firm*—McDermott Will & Emery LLP

(57) ABSTRACT

A fuel cell system includes a fuel cell that is subjected to a purge operation of supplying an inert gas to an anode and/or cathode upon shut-down of the fuel cell. The differential pressure $\Delta P$ is defined as $\Delta P = Pa - Pc$ where $Pa$ is the pressure in an inlet-side flow path leading to the anode and $Pc$ is the pressure in an inlet-side flow path leading to the cathode. The differential pressure during the purge operation is controlled such that the differential pressure during operation $\Delta Po$ and the differential pressure during the purge operation $\Delta Pp$ satisfy the relation: $0 < \Delta Po \times \Delta Pp$. This makes it possible to reduce the stress exerted on a solid electrolyte membrane and improve the long-term reliability of the fuel cell.

3 Claims, 4 Drawing Sheets

U.S. PATENT DOCUMENTS

| | | | |
|---|---|---|---|
| 6,663,990 B2 * | 12/2003 | Iio et al. | 429/22 |
| 2003/0134166 A1 * | 7/2003 | Skala et al. | 429/17 |
| 2004/0009377 A1 * | 1/2004 | Iguchi | 429/13 |
| 2004/0038098 A1 * | 2/2004 | Imamura et al. | 429/25 |
| 2004/0137285 A1 * | 7/2004 | Meltser et al. | 428/629 |
| 2004/0197614 A1 * | 10/2004 | Simpson et al. | 429/17 |
| 2005/0244686 A1 * | 11/2005 | Kamihara | 429/22 |
| 2005/0277010 A1 * | 12/2005 | Lamont et al. | 429/34 |

FOREIGN PATENT DOCUMENTS

| | | |
|---|---|---|
| JP | 58-053164 | 3/1983 |
| JP | 63-116373 | 5/1988 |
| JP | 63-170864 | 7/1988 |
| JP | 63-211005 | 9/1988 |
| JP | 5-205761 | 8/1993 |
| JP | 06-203865 | 7/1994 |
| JP | 06-251788 | 9/1994 |
| JP | 11-214025 | 8/1999 |
| JP | 11354143 A * | 12/1999 |
| JP | 2002-050372 | 2/2002 |
| JP | 2002373682 A * | 12/2002 |
| JP | 2003-168453 | 6/2003 |
| WO | WO 91/17578 | 11/1991 |

OTHER PUBLICATIONS

IPDL Machine Translation and Abstract in English of JP 11-354143.*

European Search Report issued in Patent Application No. 05703796.2 / 1227 PCT/JP2005000559 dated on Oct. 6, 2008.

* cited by examiner

FUEL CELL SYSTEM WITH DIFFERENTIAL PRESSURE CONTROL

This application is the U.S. National Phase under 35 U.S.C. §371 of International Application No. PCT/JP05/000559, filed Jan. 19, 2005, which in turn claims the benefit of Japanese Application No. 2004-013107, filed Jan. 21, 2004, the disclosures of which Applications are incorporated by reference herein in their entirety.

TECHNICAL FIELD

The present invention relates to a fuel cell system that generates electric power using a solid polymer fuel cell.

BACKGROUND ART

Fuel cells are basically composed of a pair of electrodes, i.e., anode and cathode, sandwiching an ion-conductive electrolyte, and an anode-side separator and a cathode-side separator sandwiching the electrodes. The anode-side separator has a flow channel for supplying a fuel to the anode, while the cathode-side separator has a flow channel for supplying an oxidant to the cathode. By supplying the anode with a fuel, such as hydrogen gas or ethanol, and supplying the cathode with an oxidant such as oxygen or air, the chemical energy of these reactive substances is converted to electrical energy through oxidation or reduction reaction on the electrodes, to produce current.

A type of fuel cell uses a hydrogen-ion conductive polymer membrane as the electrolyte, uses hydrogen or a mixed gas composed mainly of hydrogen as the fuel, and uses oxygen or gas such as air as the oxidant. In this fuel cell, hydrogen gas is oxidized on the anode in the reaction of formula (1) to produce electrons and hydrogen ions. The hydrogen ions move through the solid electrolyte membrane and reach the cathode side. The electrons move through an external circuit and reach the cathode. The oxygen, the electrons and the hydrogen ions at the cathode are reduced in the reaction of formula (2) to produce water.

$$2H_2 \rightarrow 4H^+ + 4e \quad (1)$$

$$4H^+ + O_2 + 4e \rightarrow 2H_2O \quad (2)$$

The solid polymer membrane that is the electrolyte of this fuel cell exhibits ionic conductivity only when it is hydrated. Thus, in order to maintain the high power generation performance, the water produced by the reaction of formula (2) alone is insufficient, and it is thus necessary to supply water from outside. A common method for supplying water necessary for the operation of a fuel cell is to use a device that is placed inside or outside the fuel cell for humidifying the gas to be supplied to the fuel cell.

Also, the operation temperature of this fuel cell is usually 90° C. or lower, because there are limitations resulting from the heat-resisting performance of the solid polymer membrane serving as the electrolyte. However, since the reactions of formulae (1) and (2) are unlikely to occur in an environment of 90° C. or lower, the anode and cathode need to be equipped with a catalyst that is capable of activating such reaction. Therefore, the anode and cathode of this fuel cell comprise platinum with a high catalytic ability.

An exemplary conventional fuel cell system including this fuel cell is a system that is configured as illustrated in FIG. 1 (see Patent Document 1, for example). That is, this system includes a fuel cell 10 that generates power by reacting hydrogen supplied from hydrogen supply means 11 with oxygen in the humidified air that is supplied from air supply means 12 via a humidifier 13. It includes a pump 16 for circulating cooling water through the fuel cell 10 to collect the heat of electrode reaction, and an inverter 25 for converting the direct current generated by the fuel cell 10 into an alternating current. The cooling water circulated by the pump 16 releases the thermal energy it acquired from the fuel cell at a heat exchanger 19. On the other hand, the water in a hot water reservoir 18 that is circulated by a pump 17 absorbs heat from the heat exchanger 19 and becomes warm water, which is stored in the hot water reservoir 18.

In this conventional system, a flow path 14 leading to a fuel gas inlet 14a of the fuel cell 10 and a flow path 15 leading to an air inlet 15a are provided with three-way valves 21 and 22, respectively. When the operation of the fuel cell 10 is shut down, an inert gas is supplied to the fuel gas flow path and the air flow path from an inert gas cylinder 20. 14b represents a fuel gas outlet, and 15b denotes an air outlet.

In order for such a fuel cell system as the above example to efficiently utilize the chemical energy of the fuel gas, there is a need to change the output of the operation or repeatedly start up and shut down the system according to the demand for power it supplies. However, in starting up and shutting down the fuel cell which is a power generation source, the following problems arise, so the gas supplied to one or both of the anode and the cathode needs to be replaced, i.e., purged, with an inert gas.

First, in terms of safety, a problem associated with the start-up and shut-down is that hydrogen gas needs to be removed from the fuel cell during shut-down. The reason is that since the solid polymer membrane separating the anode from the cathode is permeable to oxygen gas and hydrogen gas, hydrogen and oxygen become mixed together if the shut-down of operation of the fuel cell is maintained for an extended period of time.

Second, in terms of power generation efficiency, oxygen gas in the cathode needs to be removed. The reason is as follows. When oxygen is present in the cathode at the time of no load, the cathode has a potential of approximately 1 V relative to the potential of the standard hydrogen electrode. This potential causes oxidation reaction or dissolution reaction of platinum serving as the electrode catalyst, thereby lowering the catalyzing ability of the electrode.

Third, in terms of start-up stability, water vapor in the anode and cathode needs to be removed. The reason is as follows. The gas inside the fuel cell has a relative humidity close to 100% at the temperature during operation, because of the combination of the humidified gas supplied to the fuel cell and the water produced in the reaction of formula (2). Although the operation temperature of the fuel cell is normally 60° C. to 80° C., the gas remaining in the fuel cell during the shut-down of the fuel cell is cooled to room temperature. Thus, the moisture in the gas condenses into water. When the fuel cell is started up, the temperature of the fuel cell is low, so the condensed water remains in liquid form in the cell. The condensed water covers the platinum surface, clogs the pores of the porous gas diffusion layer, and closes the gas flow channel of the separator, so that the gas diffusion is hampered, thereby resulting in unstable power generation upon start-up.

With respect to the purge method for solving these problems, the most common method is shown in FIG. 1. That is, the system is equipped with the cylinder 20 of an inert gas such as nitrogen gas, and when the fuel cell is shut down, the inert gas is supplied through the flow path 14 leading to the fuel gas inlet 14a of the fuel cell 10 and the flow path 15 leading to the air inlet 15a, using the pressure of the cylinder as the driving power. Other methods that have been proposed so far include a method of purging with cooling water (e.g., Patent Document 2), a method of removing oxygen from the cathode exhaust gas and resupplying it to the fuel cell (e.g., Patent Document 3), and a method of burning the fuel hydrogen and air and then supplying it to the fuel cell (e.g., Patent Document 4).

Patent Document 1: Japanese Laid-Open Patent Publication No. Hei 11-214025

Patent Document 2: Japanese Laid-Open Patent Publication No. Hei 06-251788

Patent Document 3: Japanese Laid-Open Patent Publication No. Hei 06-203865

Patent Document 4: Japanese Laid-Open Patent Publication No. 2002-50372

DISCLOSURE OF INVENTION

Problem that the Invention is to Solve

The object of purging in conventional techniques is to replace the gas present in a fuel cell during shut-down with an inert gas. Also, in consideration of the start-up/shut-down characteristics of fuel cells, the purge time is desirably as short as possible. Hence, as the purge conditions satisfying these requirements, the desirable purge method is to supply an inert gas at a large flow rate so as to replace the gas inside a fuel cell within a short period of time.

However, if there is a large difference between the amount of gas supplied during operation and the amount of gas supplied during purging, there is a sharp change in the differential pressure between the anode and the cathode in the fuel cell, which poses a problem.

Fuel cells of this type usually employ a solid polymer membrane with a thickness of a few tens of μm. The solid polymer membrane is required to have the function of separating the fuel gas of the anode from the oxidant gas of the cathode in addition to the function as the electrolyte. The differential pressure between the anode and the cathode constantly distorts the solid polymer membrane. A rapid change in the amount of distortion lowers the strength of the solid polymer membrane, thereby shortening the time it takes for the solid polymer membrane to be broken by repeated start-ups and shut-downs of daily operation. Particularly, if the relation between the amount of pressure loss in the anode and the cathode during operation and that during purging is reversed, the solid polymer membrane vibrates from the anode side to the cathode side, so that the strength of the solid polymer membrane is significantly impaired. That is, a problem with the purge methods according to the conventional techniques is that repetitive purging without controlling the differential pressure lowers the long-term reliability of the fuel cell.

The present invention solves the above-mentioned problems associated with the conventional techniques and intends to improve the long-term reliability of a fuel cell that is repeatedly started up and shut down, by measuring the pressure of fuel gas of the anode and that of oxidant gas of the cathode and controlling the pressure in the anode or cathode based on the measured values.

Means for Solving the Problem

In order to solve the above-mentioned problems, a fuel cell system according to the present invention includes: a fuel cell; fuel gas supply means for supplying a fuel gas to an anode of the fuel cell; oxidant gas supply means for supplying an oxidant gas to a cathode of the fuel cell; inert gas supply means for supplying an inert gas to the anode and/or cathode of the fuel cell; and means for measuring a pressure Pa in an inlet-side flow path leading to the anode of the fuel cell and a pressure Pc in an inlet-side flow path leading to the cathode. The fuel cell is subjected to a purge operation of replacing the fuel gas and/or oxidant gas in the fuel cell with the inert gas supplied from the inert gas supply means when the fuel cell is started up or shut-down. The fuel cell system further includes control means for increasing or decreasing the amount of the inert gas supplied to the fuel cell based on the values of Pa and Pc during the puree operation of the fuel cell. The differential pressure $\Delta P$ is defined as $P=Pa-Pc$, and the during operation $\Delta Po$ and the differential pressure during the purge operation $\Delta Pp$ satisfy the relations: $0<\Delta Po\times\Delta Pp$ and $|\Delta Pp|\leq|\Delta Po|$.

According to the present invention, since the relation between $\Delta Po$ and $\Delta Pp$ can be controlled favorably, it is possible to prevent this relation from becoming $\Delta Po\times\Delta Pp<0$ even temporarily.

It is preferred that $\Delta Po$ and $\Delta Pp$ satisfy the relation: $\Delta Po=\Delta Pp$.

In another preferable embodiment of the present invention, the system includes means for changing the internal diameter of an outlet-side flow path of an exhaust gas from the fuel cell, and means for changing the internal diameter based on the values of Pa and Pc during the purge operation of the fuel cell. According to this embodiment, the relation between $\Delta Po$ and $\Delta Pp$ can be controlled favorably.

The present invention makes it possible to favorably control the differential pressure during purging that is performed when the fuel cell is started up or shut down.

EFFECTS OF THE INVENTION

According to the present invention, during operation and during purging, the pressure on one of the anode-side and the cathode-side of the electrolyte membrane is controlled such that it is constantly larger than the pressure on the other side. It is therefore possible to suppress degradation of the strength of the solid polymer membrane caused by the vibration thereof which occurs during start-up or shut-down purging. Accordingly, it is possible to provide a fuel cell system having a high reliability in a long-term operation that is subject to start-ups and shut-downs.

BEST MODE FOR CARRYING OUT THE INVENTION

Embodiments of the present invention are hereinafter described with reference to drawings.

Embodiment 1

Figure 2:
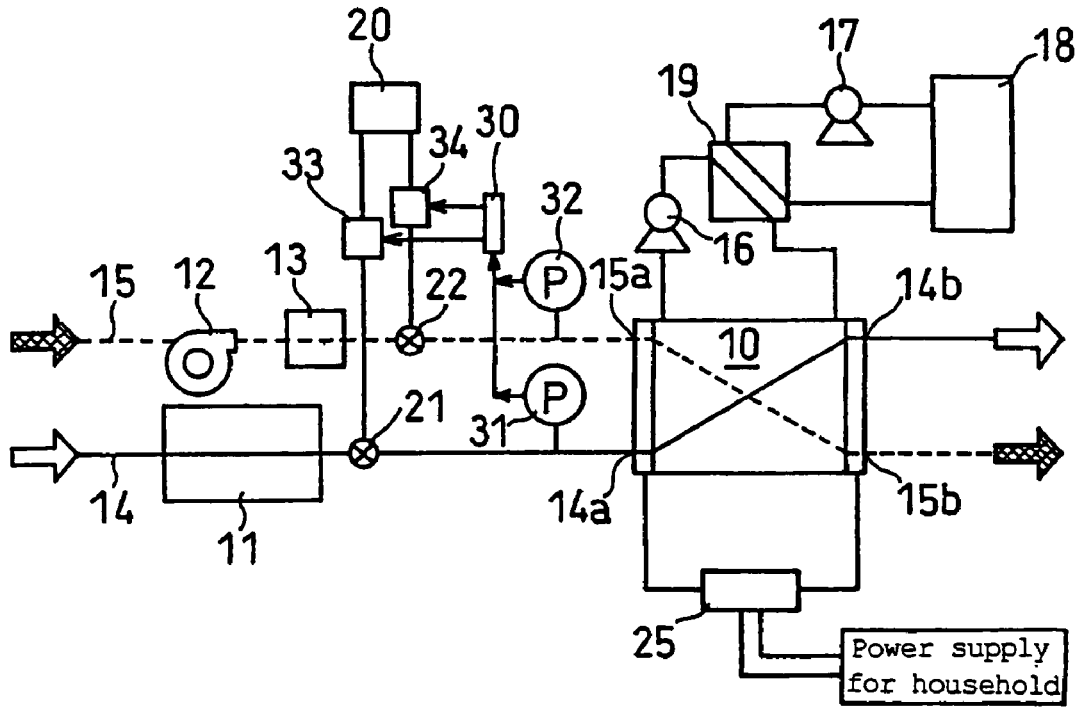
FIG. 2 A diagram showing the structure of a fuel cell system according to Embodiment 1 of the present invention.

FIG. 2 is a diagram showing the structure of a fuel cell system according to Embodiment 1 of the present invention.

The fuel cell system of Embodiment 1 includes a solid polymer type fuel cell 10 that generates electric power using a fuel gas and an oxidant gas, hydrogen supply means 11 for producing a hydrogen-rich gas by steam-reforming of a raw material such as natural gas and supplying it to the fuel cell 10, air supply means 12 for taking in outside air as an oxidant gas, and a humidifier 13 for humidifying the air as appropriate. It also includes a pump 16 for circulating cooling water to collect the heat generated during the power generation of the fuel cell 10, a heat exchanger 19 for collecting/storing the thermal energy collected from the cooling water, a hot water reservoir 18, a circulation pump 17 for circulating the water in the hot water reservoir 18 through the heat exchanger 19, and an inverter 25 for converting the direct current generated by the fuel cell 10 into an alternating current. It further includes an inert gas cylinder 20 for supplying an inert gas to the fuel cell 10 upon shut-down of the operation.

Although the above-mentioned constituent elements are the same as those of the system according to conventional techniques, this embodiment further includes manometers 31 and 32 for measuring the pressure in a flow path 14 on the side of a fuel gas inlet 14a and the pressure in a flow path 15 on the side of an air inlet 15a, massflow controllers 33 and 34 for controlling the flow rate of the inert gas supplied to each inlet, and a controller 30 for storing the pressures measured by the manometers 31 and 32 and controlling the massflow controllers 33 and 34 based on the measured values.

As used herein, the inert gas refers to gas that does not cause an oxidation-reduction reaction serving as a single electrode on platinum in a highly humid atmosphere at 0° C. to 100° C., for example, rare gases such as helium and argon, nitrogen, desulfurized natural gas, and water vapor.

The purge sequence of Embodiment 1 for shutting down the operation is described below.

When the demand for power from the external circuit disappears and a stop signal is sent to the fuel cell system, first, the output of the fuel cell system is reduced to a minimum output. At this time, the flow rates of the massflow controllers 33 and 34 are set to minimum controllable values of flow rates. The minimum output is maintained for a given period of time in order to stabilize the gas flows inside the fuel cell, and then the pressures in the fuel gas inlet 14a and the air inlet 15a measured by the manometers 31 and 32 are recorded by the controller 30.

Next, the electric circuit connected to the inverter 25 is opened, and the hydrogen supply means 11 and the air supply means 12 are stopped.

Subsequently, the pressures recorded by the controller 30 are compared, and the valve in the inert gas flow path connected to the inlet having a larger pressure, for example, the valve 21 connected to the inlet 14a, is opened and the flow rate of the inert gas is increased in stages by means of the massflow controller 33 until an intended flow rate is reached.

Thereafter, the valve in the inert gas flow path connected to the other inlet, for example, the valve 22 connected to the inlet 15a, is opened and the flow rate of the inert gas is increased in stages in the same manner. When the absolute value |ΔPp| of the difference between the pressures in the two inlet-side flow paths during purging becomes smaller than the absolute value |ΔPo| of the pressure difference during operation, the increase of flow rate of the inert gas is stopped, and the flow rate at this time is maintained.

In this state, the inert gas is supplied into the fuel cell for a predetermined time. Thereafter, in the reverse manner of the supply of the inert gas, the valve in the inert gas flow path connected to the inlet having a smaller recorded pressure, for example, the valve 22 connected to the inlet 15a, is closed, and then the valve in the inert gas flow path connected to the other inlet, for example, the valve 21 connected to the inlet 14a, is closed. This is the sequence performed when the fuel cell is shut down.

The purge sequence for restart-up is described below.

When a power demand arises from the external circuit and a start signal is sent to the fuel cell system, first, the flow rates of the massflow controllers 33 and 34 are set to minimum controllable values of flow rates. Subsequently, the pressures recorded by the controller 30 upon the previous shut-down are compared, and the valve in the inert gas flow path connected to the inlet having a larger pressure, for example, the valve 21 connected to the inlet 14a, is opened and the flow rate of the inert gas is increased in stages by means of the massflow controller 33 until an intended flow rate is reached. Thereafter, the valve in the inert gas flow path connected to the other inlet, for example, the valve 22 connected to the inlet 15a, is opened and the flow rate of the inert gas is increased in stages in the same manner. When the absolute value |ΔPp| of the differential pressure during purging becomes smaller than the absolute value |ΔPo| of the differential pressure during operation, the increase of flow rate of the inert gas is stopped, and the flow rate at this time is maintained.

In this state, the inert gas is supplied into the fuel cell for a predetermined time. Thereafter, in the reverse manner of the supply of the inert gas, the valve in the inert gas flow path connected to the inlet having a smaller recorded pressure, for example, the valve 22 connected to the inlet 15a, is closed, and then the valve in the inert gas flow path connected to the other inlet, for example, the valve 21 connected to the inlet 14a, is closed.

Next, the hydrogen supply means 11 and the air supply means 12 are actuated, and this state is maintained for a period of time that is sufficient for the fuel gas and air to permeate the fuel cell 10. Then, the electric circuit connected to the inverter 25 is closed, and power generation is started. This is the sequence performed when the fuel cell is started.

In the above-mentioned sequences for start-up and shut-down, more desirably, the pressure in the inlet, for example, 15a, to which the inert gas is supplied later is increased until it becomes equal to the pressure in the inlet, for example, 14a, to which the inert gas is supplied earlier.

With the configuration of the fuel cell system and the purge method in Embodiment 1, during operation and purging, the solid electrolyte membrane of the fuel cell 10 constantly receives force from one direction due to the differential pressure, and hence, the degradation of strength caused by vibrations is not promoted. It is therefore possible to provide a fuel cell system having a high reliability in a long-term operation that is subject to start-ups and shut-downs.

Embodiment 2

Figure 3:
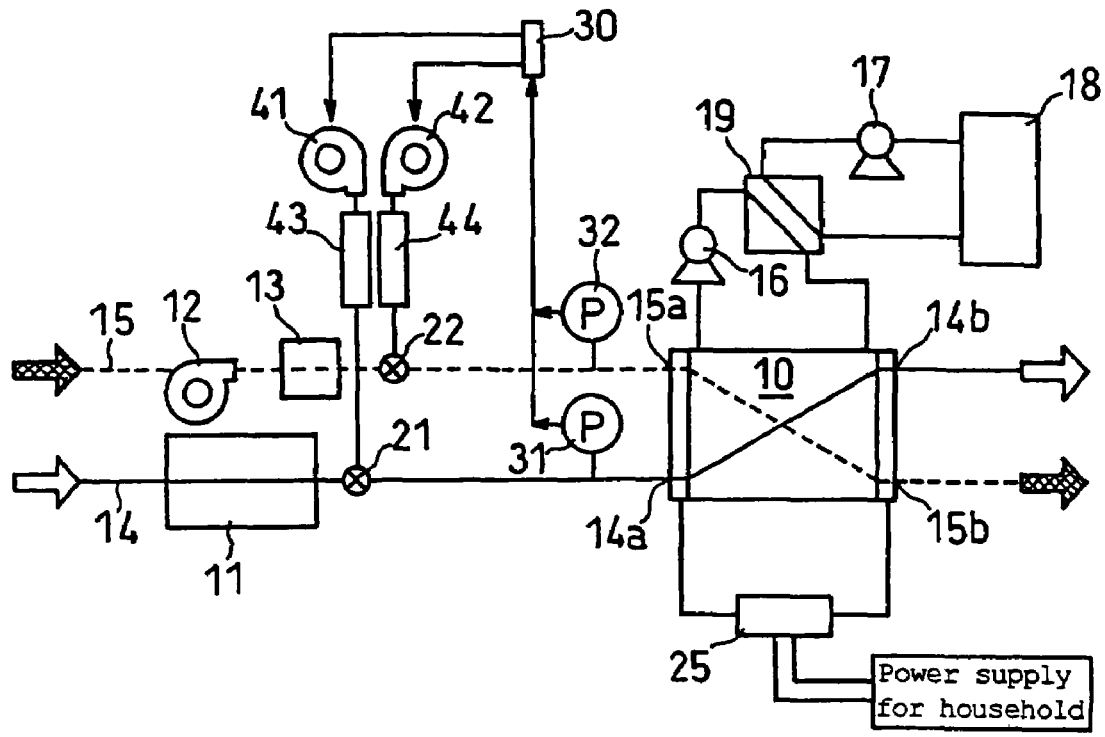
FIG. 3 A diagram showing the structure of a fuel cell system according to Embodiment 2 of the present invention.

FIG. 3 is a diagram showing the structure of a fuel cell system according to Embodiment 2 of the present invention.

The fuel cell system of Embodiment 2 has blowers 41 and 42, instead of the inert gas cylinder 20, in the conventional system as described in Embodiment 1. The air introduced into the system by the blowers 41 and 42 from the outside is passed through combustors 43 and 44, so that oxygen in the air is consumed and nitrogen gas serving as the inert gas is produced. This gas is supplied to the fuel cell as the purge gas. Further, the system is equipped with the manometers 31 and 32 for measuring the pressure in the fuel gas flow path 14 on the inlet 14a side and the pressure in the air flow path 15 on the inlet 15a side, and the controller 30 for storing the pressures measured by the manometers 31 and 32 and controlling the outputs of the blowers 41 and 42 based on the measured values.

The purge sequence of Embodiment 2 for shut-down is described below.

When the demand for power from the external circuit disappears and a stop signal is sent to the fuel cell system, first, the output of the fuel cell system is reduced to a minimum output. The minimum output is maintained for a given period of time in order to stabilize the gas flows inside the fuel cell, and then the pressures in the fuel gas flow path 14 on the inlet 14a side and the air flow path 15 on the inlet 15a side measured by the manometers 31 and 32 are recorded by the controller 30.

Next, the electric circuit connected to the inverter 25 is opened, and the hydrogen supply means 11 and the air supply means 12 are stopped, and the combustors 43 and 44 are ignited.

Subsequently, the pressures recorded by the controller 30 are compared, and the blower connected to the inlet having a larger pressure, for example, the blower 41 connected to the inlet 14a, is actuated and at the same time the valve 21 in the gas flow path leading to the fuel cell 10 is opened. By increasing the output of the blower 41, the flow rate of the inert gas is increased in stages until an intended flow rate is reached.

Thereafter, the blower connected to the other inlet, for example, the blower 42 connected to the inlet 15a, is actuated and at the same time the valve 22 in the gas flow path leading to the fuel cell 10 is opened. Likewise, the flow rate of the inert gas is increased in stages. When the absolute value |ΔPp| of the differential pressure during purging becomes smaller than the absolute value |ΔPo| of the differential pressure during operation, the increase of flow rate of the inert gas is stopped, and the output of the blower is maintained.

In this state, the blowers are operated for a predetermined time. Thereafter, in the reverse manner of the actuation of the blowers, the valve connected to the inlet having a smaller recorded pressure, for example, the valve 22 on the blower side connected to the inlet 15a, is closed, and then the valve connected to the other inlet, for example, the valve 21 in the inert gas flow path on the blower side connected to the inlet 14a, is closed. This is the sequence performed when the fuel cell is shut down.

The purge sequence for restart-up is described below.

When a power demand arises from the external circuit and a start signal is sent to the fuel cell system, first, the combustors 43 and 44 are ignited. Subsequently, the pressures recorded by the controller 30 upon the previous shut-down are compared, and the blower connected to the inlet having a larger pressure, for example, the blower 41 connected to the inlet 14a, is actuated and at the same time the valve 21 in the gas flow path leading to the fuel cell 10 is opened. By increasing the output of the blower 41, the flow rate of the inert gas is increased in stages until an intended flow rate is reached. The blower connected to the other inlet, for example, the blower 42 connected to the inlet 15a, is actuated and at the same time the valve 22 in the gas flow path leading to the fuel cell 10 is opened. Likewise, the flow rate of the inert gas is increased in stages. When the absolute value |ΔPp| of the differential pressure during purging becomes smaller than the absolute value |ΔPo| of the differential pressure during operation, the increase of flow rate of the inert gas is stopped, and the flow rate at this time is maintained.

In this state, the blowers are operated for a predetermined time. Thereafter, in the reverse manner of the operation of the blowers, the valve connected to the inlet having a smaller recorded pressure, for example, the valve 22 connected to the inlet 15a, is closed, and then the other valve 21 is closed.

Next, the hydrogen supply means 11 and the air supply means 12 are actuated, and this state is maintained for a period of time that is sufficient for the fuel gas and air to permeate the fuel cell 10. Then, the electric circuit connected to the inverter 25 is closed, and power generation is started. This is the sequence performed when the fuel cell is started up.

In the above-mentioned sequences for start-up and shut-down, more desirably, the pressure in the inlet to which the inert gas is supplied later is increased until it becomes equal to the pressure in the inlet to which the inert gas is supplied earlier.

With the configuration of the fuel cell system and the purge method in Embodiment 2, it is possible to provide a fuel cell system having a high reliability in a long-term operation that is subject to start-ups and shut-downs, in the same manner as in Embodiment 1.

Embodiment 3

Figure 4:
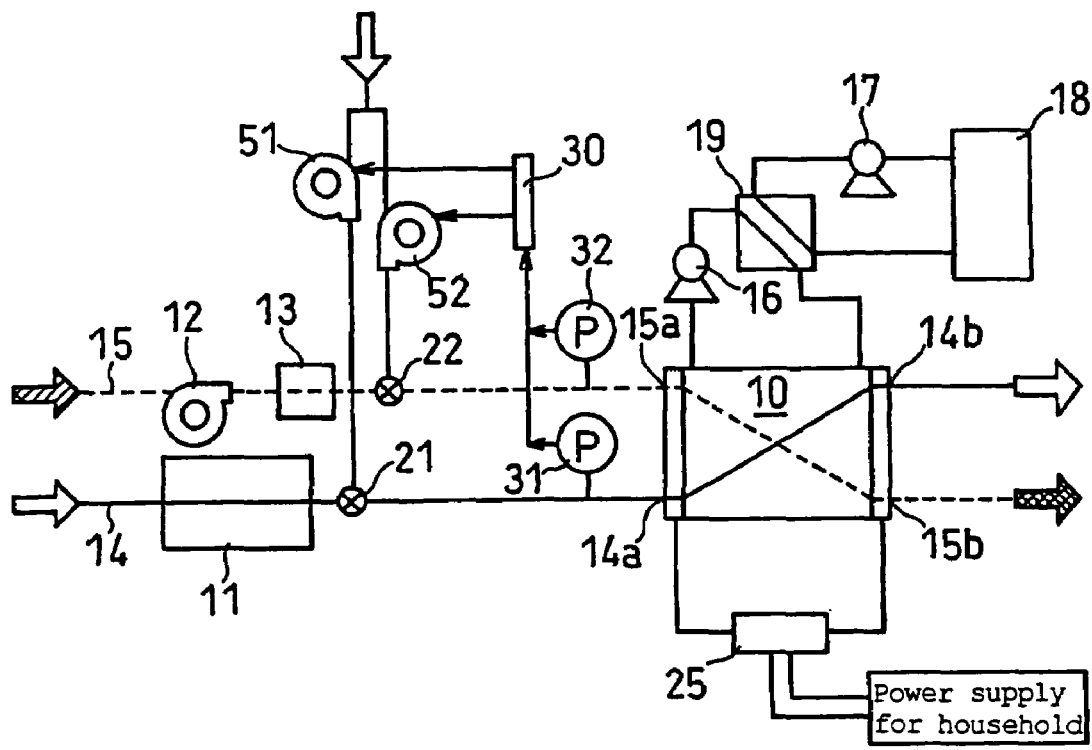
FIG. 4 A diagram showing the structure of a fuel cell system according to Embodiment 3 of the present invention.

FIG. 4 is a diagram showing the structure of a fuel cell system according to Embodiment 3 of the present invention.

The fuel cell system of Embodiment 3 has booster pumps 51 and 52, instead of the inert gas cylinder 20, in the conventional system as described in Embodiment 1. The town gas introduced into the system by the booster pumps 51 and 52 from the outside is supplied to the fuel cell as the inert gas. Further, the system is equipped with the manometers 31 and 32 for measuring the pressure in the fuel gas flow path 14 on the inlet 14a side and the pressure in the air flow path 15 on the inlet 15a side, and the controller 30 for storing the pressures measured by the manometers 31 and 32 and controlling the outputs of the booster pumps 51 and 52 based on the measured values.

The purge sequence of Embodiment 3 for shut-down is described below.

When the demand for power from the external circuit disappears and a stop signal is sent to the fuel cell system, first, the output of the fuel cell system is reduced to a minimum output. The minimum output is maintained for a given period of time in order to stabilize the gas flows inside the fuel cell, and then the pressures in the fuel gas flow path 14 on the inlet 14a side and the air flow path 15 on the inlet 15a side measured by the manometers 31 and 32 are recorded by the controller 30.

Next, the electric circuit connected to the inverter 25 is opened, and the hydrogen supply means 11 and the air supply means 12 are stopped.

Subsequently, the pressures recorded by the controller 30 are compared, and the booster pump connected to the inlet having a larger pressure, for example, the booster pump 51 connected to the inlet 14a, is actuated and at the same time the valve 21 in the gas flow path leading to the fuel cell 10 is opened. By increasing the output of the booster pump 51, the flow rate of the town gas is increased in stages until an intended flow rate is reached.

Thereafter, the booster pump connected to the other inlet, for example, the booster pump 52 connected to the inlet 15a, is actuated and at the same time the valve 22 in the gas flow path leading to the fuel cell 10 is opened. Likewise, the flow rate of the town gas is increased in stages. When the absolute value |ΔPp| of the differential pressure during purging becomes smaller than the absolute value |ΔPo| of the differential pressure during operation, the increase of flow rate of the town gas is stopped, and the outputs of the booster pumps 51 and 52 are maintained.

In this state, the booster pumps 51 and 52 are operated for a predetermined time. Thereafter, in the reverse manner of the actuation of the booster pumps, the valve connected to the inlet having a smaller recorded pressure, for example, the valve 22 on the booster pump 52 side connected to the inlet 15*a*, is closed, and then the valve connected to the other inlet, for example, the valve 21 in the inert gas flow path on the booster pump 51 side connected to the inlet 14*a*, is closed. This is the sequence performed when the fuel cell is shut down.

The purge sequence for restart-up is described below.

When a power demand arises from the external circuit and a start signal is sent to the fuel cell system, first, the pressures recorded by the controller 30 upon the previous shut-down are compared, and the booster pump connected to the inlet having a larger pressure, for example, the booster pump 51 connected to the inlet 14*a*, is actuated and at the same time the valve 21 in the gas flow path leading to the fuel cell 10 is opened. By increasing the output of the booster pump 51, the flow rate of the town gas is increased in stages until an intended flow rate is reached. The booster pump connected to the other inlet, for example, the booster pump 52 connected to the inlet 15*a*, is actuated and at the same time the valve 22 in the gas flow path leading to the fuel cell 10 is opened. Likewise, the flow rate of the town gas is increased in stages.

When the absolute value |ΔPp| of the differential pressure during purging becomes smaller than the absolute value |ΔPo| of the differential pressure during operation, the increase of flow rate of the town gas is stopped, and the flow rate at this time is maintained.

In this state, the booster pumps 51 and 52 are operated for a predetermined time. Thereafter, in the reverse manner of the operation of these booster pumps, the valve connected to the inlet having a smaller recorded pressure, for example, the valve 22 connected to the inlet 15*a*, is closed, and then the other valve 21 is closed.

Next, the hydrogen supply means 11 and the air supply means 12 are actuated, and this state is maintained for a period of time that is sufficient for the fuel gas and air to permeate the fuel cell 10. Then, the electric circuit connected to the inverter 25 is closed, and power generation is started. This is the sequence performed when the fuel cell is started up.

In the above-mentioned sequences for start-up and shut-down, more desirably, the pressure in the inlet to which the town gas is supplied later is increased until it becomes equal to the pressure in the inlet to which the town gas is supplied earlier.

With the configuration of the fuel cell system and the purge method in Embodiment 3, it is possible to provide a fuel cell system having a high reliability in a long-term operation that is subject to start-ups and shut-downs, in the same manner as in Embodiment 1.

Embodiment 4

Figures 5, 6:
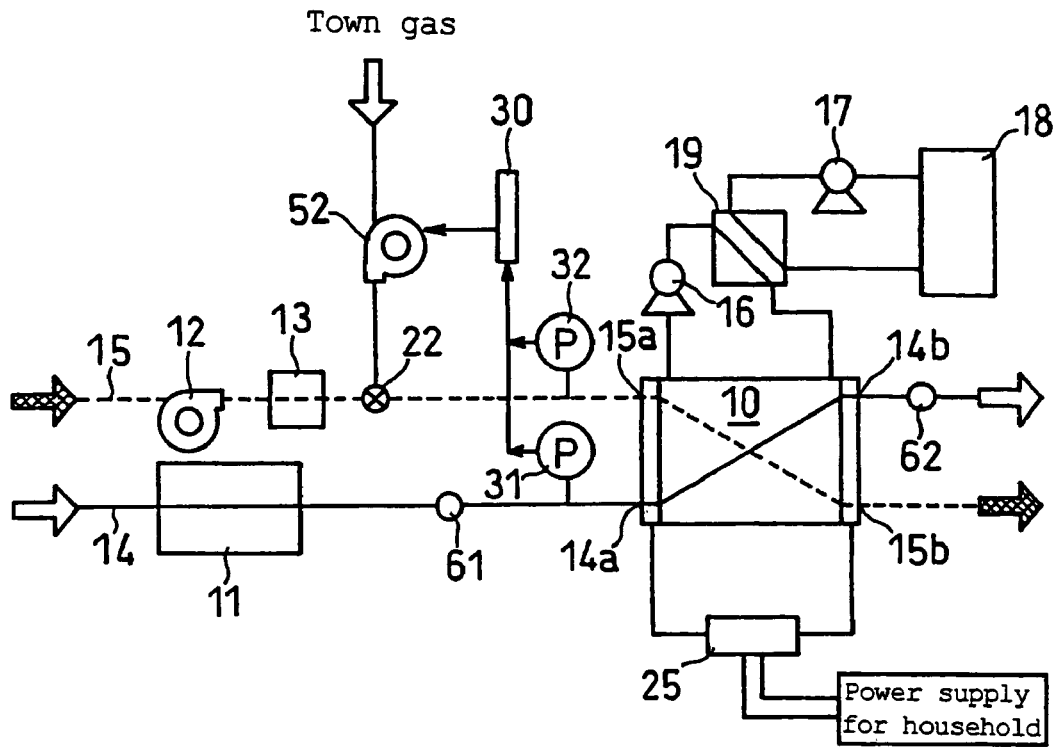
FIG. 5 A diagram showing the structure of a fuel cell system according to Embodiment 4 of the present invention.
FIG. 6 A diagram showing the structure of a fuel cell system according to Embodiment 5 of the present invention.

FIG. 5 is a diagram showing the structure of a fuel cell system according to Embodiment 4 of the present invention.

The fuel cell system of Embodiment 4 has a booster pump 52, instead of the inert gas cylinder 20, in the conventional system as described in Embodiment 1. The town gas introduced into the system by the booster pump 52 from the outside is supplied to the air flow path as the inert gas. Further, the system is equipped with the manometers 31 and 32 for measuring the pressure in the fuel gas flow path 14 on the inlet 14*a* side and the pressure in the air flow path 15 on the inlet 15*a* side, and the controller 30 for storing the pressures measured by these manometers and controlling the output of the booster pump 52 based on the measured values. Also, the fuel gas flow path 14 on the inlet 14*a* side is provided with an electromagnetic valve 61, and the fuel gas flow path on the outlet 14*b* side is provided with an electromagnetic valve 62. With respect to the pressures in the fuel gas flow path and the air flow path during operation, the fuel cell 10 is designed such that the air flow path on the inlet 15*a* side constantly has a larger pressure.

The purge sequence of Embodiment 4 for shut-down is described below.

When the demand for power from the external circuit disappears and a stop signal is sent to the fuel cell system, first, the output of the fuel cell system is reduced to a minimum output. The minimum output is maintained for a given period of time in order to stabilize the gas flows inside the fuel cell, and then the pressures in the fuel gas flow path 14 on the inlet 14*a* side and the air flow path 15 on the inlet 15*a* side measured by the manometers 31 and 32 are recorded by the controller 30.

Next, the electric circuit connected to the inverter 25 is opened, and the hydrogen supply means 11 and the air supply means 12 are stopped.

Subsequently, the electromagnetic valves 61 and 62 installed in the fuel gas flow path on the inlet 14*a* side and the fuel gas flow path on the outlet 14*b* side are closed, to seal the anode side of the fuel cell 10.

Thereafter, the booster pump 52 connected to the air flow path on the inlet 15*a* side is actuated and at the same time the valve 22 in the gas flow path leading to the fuel cell 10 is opened. Then, the output of the booster pump 52 is increased in stages until an intended flow rate is achieved so that the air in the air flow path is sufficiently replaced with the town gas. After the booster pump 52 is operated in this state for a predetermined time, the booster pump 52 is stopped, and the valve 22 connected to the air flow path on the inlet 15*a* side is closed. This is the sequence performed when the fuel cell is shut down.

The purge sequence for restart-up is described below.

When a power demand arises from the external circuit and a start signal is sent to the fuel cell system, first, the booster pump 52 is actuated and at the same time the valve 22 in the gas flow path leading to the fuel cell 10 is opened. Then, by increasing the output of the booster pump 52, the flow rate of the town gas is increased in stages until an intended flow rate is achieved so that the air which has entered the air flow path during shut-down is sufficiently replaced with the town gas. After the booster pump 52 is operated in this state for a predetermined time, the booster pump 52 is stopped, and the valve 22 connected to the air flow path on the inlet 15*a* side is closed.

Next, the valves 61 and 62 are opened, and the hydrogen supply means 11 and the air supply means 12 are actuated. This state is maintained for a period of time that is sufficient for the fuel gas and air to permeate the fuel cell 10. Then, the electric circuit connected to the inverter 25 is closed, and power generation is started. This is the sequence performed when the fuel cell is started up.

With the configuration of the fuel cell system and the purge method in Embodiment 4, it is possible to provide a fuel cell system having a high reliability in a long-term operation that is subject to start-ups and shut-downs, in the same manner as in Embodiment 1.

Embodiment 5

FIG. 6 is a diagram showing the structure of a fuel cell system according to Embodiment 5 of the present invention.

The fuel cell system of Embodiment 5 has a booster pump 51, instead of the inert gas cylinder 20, in the conventional system as described in Embodiment 1. The town gas introduced into the system by the booster pump 51 from the outside is supplied to the fuel gas flow path as the inert gas. Further, the system is equipped with the manometers 31 and 32 for measuring the pressure in the fuel gas flow path 14 on the inlet 14a side and the pressure in the air flow path 15 on the inlet 15a side, and the controller 30 for storing the pressures measured by these manometers and controlling the output of the booster pump 51 based on the measured values. Also, the air flow path 15 on the inlet 15a side is provided with an electromagnetic valve 63, and the air flow path on the outlet 15b side is provided with an electromagnetic valve 64. With respect to the pressures in the fuel gas flow path and the air flow path during operation, the fuel cell 10 is designed such that the air flow path on the inlet 15a side constantly has a larger pressure.

The purge sequence of Embodiment 5 for shut-down is described below.

When the demand for power from the external circuit disappears and a stop signal is sent to the fuel cell system, first, the output of the fuel cell system is reduced to a minimum output. The minimum output is maintained for a given period of time in order to stabilize the gas flows inside the fuel cell, and then the pressures in the fuel gas flow path on the inlet 14a side and the air flow path on the inlet 15a side measured by the manometers 31 and 32 are recorded by the controller 30.

Next, the electric circuit connected to the inverter 25 is opened, and the hydrogen supply means 11 and the air supply means 12 are stopped.

Subsequently, the electromagnetic valves 63 and 64 installed in the air flow path on the inlet 15a side and the air flow path on the outlet 15b side are closed, to seal the cathode side of the fuel cell 10.

Thereafter, the booster pump 51 connected to the fuel gas flow path on the inlet 14a side is actuated and at the same time the valve 21 in the gas flow path leading to the fuel cell 10 is opened. Then, the output of the booster pump 51 is increased in stages until an intended flow rate is achieved so that the hydrogen in the fuel gas flow path is sufficiently replaced with the town gas. After the booster pump 51 is operated in this state for a predetermined time, the booster pump 51 is stopped, and the valve 21 connected to the fuel gas flow path on the inlet 14a side is closed. This is the sequence performed when the fuel cell is shut down.

The purge sequence for restart-up is described below.

When a power demand arises from the external circuit and a start signal is sent to the fuel cell system, first, the booster pump 51 is actuated and at the same time the valve 21 in the gas flow path leading to the fuel cell 10 is opened. Then, by increasing the output of the booster pump 51, the flow rate of the town gas is increased in stages until an intended flow rate is achieved so that the hydrogen which has entered the fuel gas flow path during shut-down is sufficiently replaced with the town gas. After the booster pump 51 is operated in this state for a predetermined time, the booster pump 51 is stopped, and the valve 21 connected to the fuel gas flow path on the inlet 14a side is closed.

Next, the valves 63 and 64 are opened, and the hydrogen supply means 11 and the air supply means 12 are actuated. This state is maintained for a period of time that is sufficient for the fuel gas and air to permeate the fuel cell 10. Then, the electric circuit connected to the inverter 25 is closed, and power generation is started. This is the sequence performed when the fuel cell is started up.

With the configuration of the fuel cell system and the purge method in Embodiment 5, it is possible to provide a fuel cell system having a high reliability in a long-term operation that is subject to start-ups and shut-downs, in the same manner as in Embodiment 1.

Embodiment 6

Figure 7:
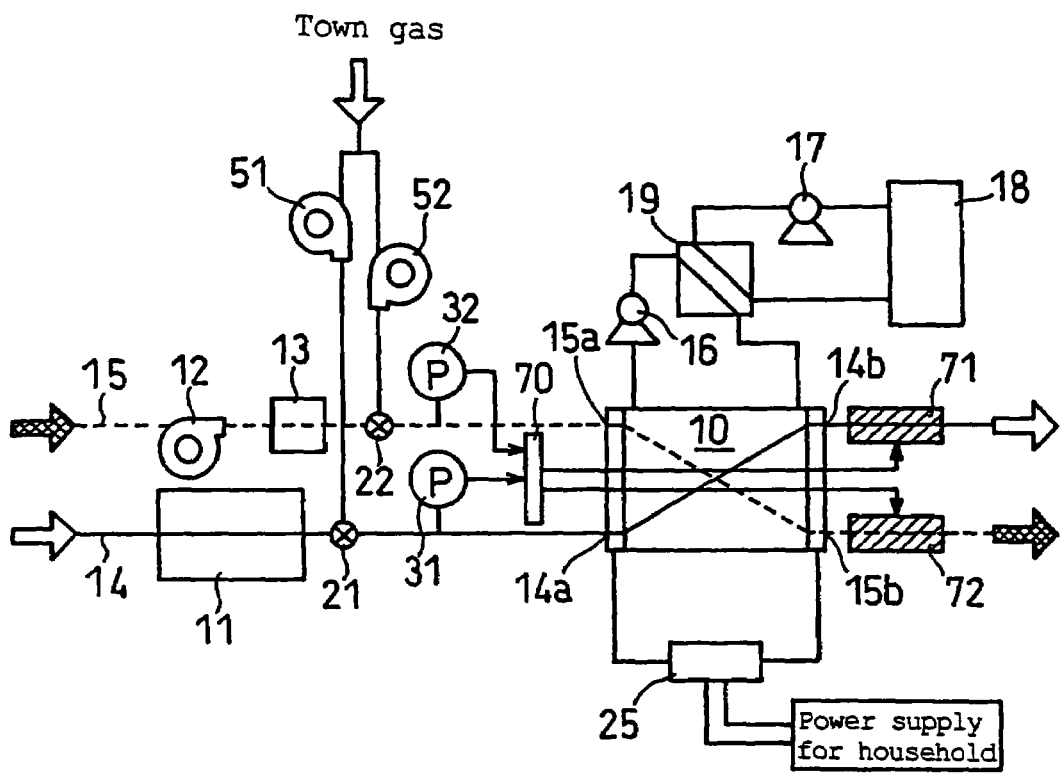
FIG. 7 A diagram showing the structure of a fuel cell system according to Embodiment 6 of the present invention.

FIG. 7 is a diagram showing the structure of a fuel cell system according to Embodiment 6 of the present invention.

The fuel cell system of Embodiment 6 has the booster pumps 51 and 52, instead of the inert gas cylinder 20, in the conventional system as described in Embodiment 1. The town gas introduced into the system by the booster pumps 51 and 52 from the outside is supplied to the fuel cell as the inert gas. Further, the system includes the manometers 31 and 32 for measuring the pressure in the fuel gas flow path 14 on the inlet 14a side and the pressure in the air flow path 15 on the inlet 15a side, and pressure-adjusting valves 71 and 72 that are installed in the fuel gas flow path on the outlet 14b side and the air flow path on the outlet 15b side and are capable of changing the internal diameters of these gas flow paths. The system also includes a controller 70 for storing the pressures measured by the manometers 31 and 32 and controlling the outputs of the pressure-adjusting valves 71 and 72 based on the measured values.

Although Embodiment 6 employs a system in which the internal diameters of the gas flow paths are changed by the pressure-adjusting valves 71 and 72, there is no limitation to the system of Embodiment 6. Other systems are also available in which the lengths of the flow paths are increased or the resistances of the flow paths are changed by bending.

The purge sequence of Embodiment 6 for shut-down is described below.

When the demand for power from the external circuit disappears and a stop signal is sent to the fuel cell system, first, the output of the fuel cell system is reduced to a minimum output. The minimum output is maintained for a given period of time in order to stabilize the gas flows inside the fuel cell, and then the pressures in the fuel gas flow path on the inlet 14a side and the air flow path on the inlet 15a side measured by the manometers 31 and 32 are recorded by the controller 70.

Next, the electric circuit connected to the inverter 25 is opened, and the hydrogen supply means 11 and the air supply means 12 are stopped.

Subsequently, the pressure-adjusting valves 71 and 72 connected to the outlet-side flow paths are controlled in the following manner. That is, the pressures in the inlet-side flow paths recorded by the controller 70 are compared, and the pressure-adjusting valve in the flow path having a larger pressure, for example, the pressure-adjusting valve 71 in the fuel gas flow path is opened at 10% and the other valve is fully opened. Thereafter, the booster pump 51 connected to the fuel gas flow path is actuated and at the same time the valve 21 in the gas flow path leading to the fuel cell 10 is opened, in the same manner as the above.

Then, the booster pump 52 connected to the other inlet is actuated and at the same time the valve 22 in the gas flow path leading to the fuel cell 10 is opened. By narrowing the pressure-adjusting valve 72 in stages, the pressure loss in the inlet-side flow path is increased. When the absolute value |ΔPp| of the differential pressure during purging becomes smaller than the absolute value |ΔPo| of the differential pressure during operation, the increase of flow rate of the town gas is stopped, and the flow rate at this time is maintained.

The town gas is supplied in this state into the fuel cell for a predetermined time. Thereafter, in the reverse manner of the supply of the town gas, the valve in the town gas flow path connected to the inlet having a smaller recorded pressure, for example, the valve 22 connected to the inlet 15a, is closed. Subsequently, the valve in the town gas flow path connected to the other inlet, for example, the valve 21 connected to the inlet 14a, is closed. This is the sequence performed when the fuel cell is shut down.

The purge sequence for restart-up is described below.

When a power demand arises from the external circuit and a start signal is sent to the fuel cell system, first, the pressure-adjusting valves 71 and 72 connected to the outlet-side flow paths are controlled in the following manner. That is, the pressures in the inlet-side flow paths recorded by the controller 70 are compared, and the pressure-adjusting valve in the flow path having a larger pressure, for example, the pressure-adjusting valve 71 in the fuel gas flow path, is opened at 10% and the other valve is fully opened. Subsequently, the booster pump 51 connected to the flow path having a larger pressure in the same manner as the above is actuated and at the same time the valve 21 in the gas flow path leading to the fuel cell 10 is opened.

Then, the booster pump 52 connected to the other inlet-side flow path is actuated and at the same time the valve 22 in the gas flow path leading to the fuel cell 10 is opened. By narrowing the pressure-adjusting valve 72 in stages, the pressure loss in the air inlet-side flow path is increased. When the absolute value |ΔPp| of the differential pressure during purging becomes smaller than the absolute value |ΔPo| of the differential pressure during operation, the increase of flow rate of the town gas is stopped, and the flow rate at this time is maintained.

The town gas is supplied in this state into the fuel cell for a predetermined time. Thereafter, in the reverse manner of the supply of the town gas, the valve in the town gas flow path connected to the inlet having a smaller recorded pressure, for example, the valve 22 connected to the inlet 15a, is closed. Subsequently, the valve in the town gas flow path connected to the other inlet, for example, the valve 21 connected to the inlet 14a, is closed.

Next, the hydrogen supply means 11 and the air supply means 12 are actuated, and this state is maintained for a period of time that is sufficient for the fuel gas and air to permeate the fuel cell 10. Then, the electric circuit connected to the inverter 25 is closed, and power generation is started. This is the sequence performed when the fuel cell is started up.

In the above-mentioned sequences for start-up and shut-down, more desirably, the pressure in the inlet to which the town gas is supplied later is increased until it becomes equal to the pressure in the inlet to which the town gas is supplied earlier.

With the configuration of the fuel cell system and the purge method in Embodiment 6, during operation and purging, the solid electrolyte membrane of the fuel cell 10 constantly receives force from one direction due to the differential pressure, and hence, the degradation of strength caused by vibrations is not promoted. It is therefore possible to provide a fuel cell system having a high reliability in a long-term operation that is subject to start-ups and shut-downs.

In the foregoing embodiments, the system was equipped with the hydrogen supply means 11. However, hydrogen may be directly supplied therein from the outside of the system and then humidified by means of a humidifier in order to supply it to the fuel cell, in the same manner as air.

EXAMPLE

Figure 1:
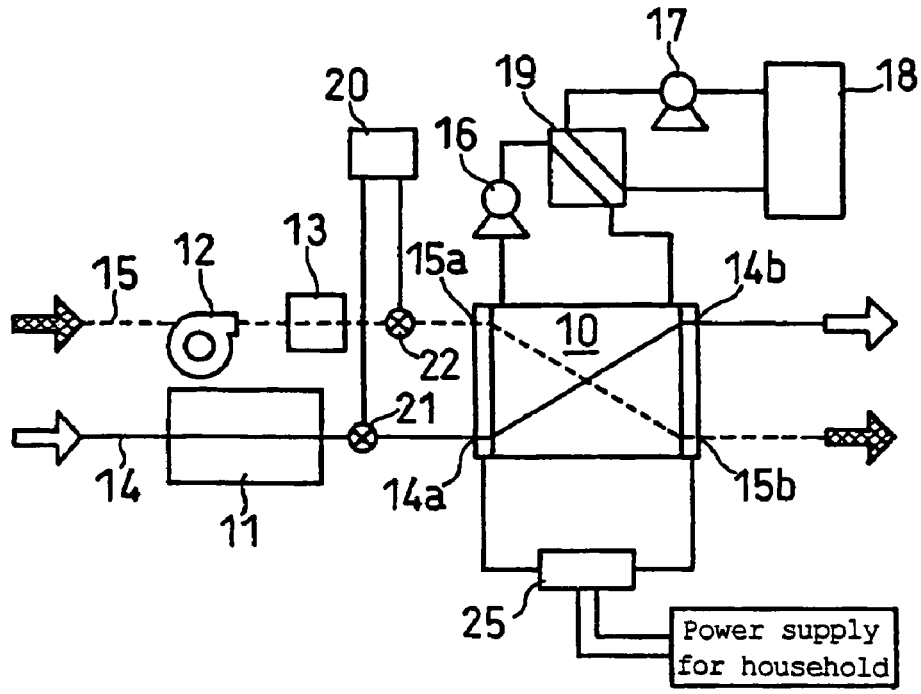
FIG. 1 A diagram schematically showing the structure of a conventional fuel cell system.

According to Embodiments 1 to 6 of the present invention as illustrated in FIG. 2 to FIG. 7, fuel cell systems were fabricated as Examples 1 to 6, and the effects of the invention were checked. Also, as a comparative example, a fuel cell system with a structure shown in FIG. 1 was fabricated.

In the examples and the comparative example, a hydrogen cylinder was used as the hydrogen supply means 11. Also, blowers (VB-004-DN available from Hitachi, Ltd.) were used as the air supply means 12, purge air blower and booster pumps 51 and 52.

With respect to the fuel cell stack, the electrode area was 8 cm×10 cm, and the outer dimensions of the separator were 10 cm×20 cm. The gas flow channels of the separators were designed such that the air flow channel had a smaller flow channel resistance. The fuel cell stack used was composed of a stack of 100 unit cells.

Nitrogen was used as the inert gas in Examples 1 and 2, while town gas was used as the inert gas in Examples 4 to 6. The fuel cell stacks used in the examples and the comparative example were subjected to a start-up/shut-down cycle test according to the following sequence, in order to confirm the effects of the examples. In this sequence, an external load was used for controlling power generation in such a manner that power was generated at a current density of 0.5 A/cm$^2$. Also, in this sequence, in order to check the effect of temperature change on the durability of the fuel cell stack, the time necessary for the temperature of the fuel cell to lower to room temperature after the shut-down of the operation was measured, and it turned out to be 3.2±0.4 hours. Thus, the shut-down time was set to 4.0 hours.

Sequence: power generation (2.0 hrs)→shut-down purge (1.0 hr)→restart purge (1.0 hr)→shut-down (4.0 hrs)→power generation (2.0 hrs)→ . . . (repeated).

Figure 8:
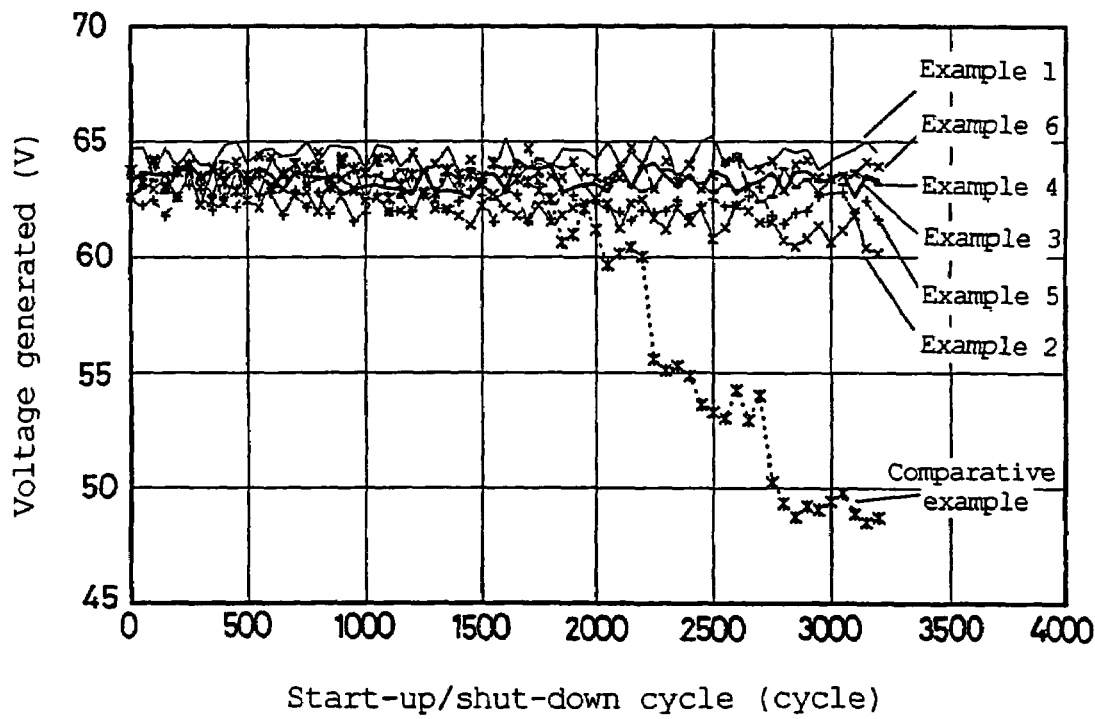
FIG. 8 A graph showing the voltages generated in cycle tests of fuel cell stacks according to the examples of the present invention and a comparative example.

Examples 1 to 6 and the comparative example were repeatedly operated according to the above-mentioned sequence, to check average voltage values during operation. FIG. 8 shows the result. In FIG. 8, there is a sharp drop in the voltage of the comparative example after 1800 cycles, but no major voltage change is found even after 3000 cycles in Examples 1 to 6. After the test, unit cells of the fuel cell stacks that exhibited voltage drops were disassembled and examined. As a result, their electrolyte membranes were found to be broken at the edge portions contacting the gas flow channels of the separators. Accordingly, the effects of the invention were confirmed.

INDUSTRIAL APPLICABILITY

The solid polymer fuel cell system according to the present invention is useful as a domestic cogeneration system. It is also applicable as an energy source of automotive prime motors, such as cars, buses and scooters.

The invention claimed is:
1. A fuel cell system comprising:
a fuel cell comprising an anode, a cathode, an inlet-side flow path leading to the anode, and an inlet-side flow path leading to the cathode;
fuel gas supply means for supplying a fuel gas to the anode;
oxidant gas supply means for supplying an oxidant gas to the cathode;
inert gas supply means for supplying an inert gas to the anode and/or cathode;

means for measuring a pressure Pa in the inlet-side flow path leading to the anode and a pressure Pc in the inlet-side flow path leading to the cathode; and a controller configured to:

variably control the flow rate of the inert gas supplied to said fuel cell based on the values of Pa and Pc during a purge operation of replacing the fuel gas and/or oxidant gas in said fuel cell with the inert gas supplied from said inert gas supply means when said fuel cell is started up or shut down, such that the relation $0 < \Delta Po \times \Delta Pp$ is always satisfied and the relation $|\Delta Pp| < |\Delta Po|$ is satisfied, where a differential pressure $\Delta P$ is defined as $\Delta P = Pa - Pc$, $\Delta Po$ is the differential pressure during operation, and $\Delta Pp$ is the differential pressure during the purge operation;

perform the purge operation for shutting down said fuel cell by: comparing the pressure Pa in the inlet-side flow path leading to the anode and the pressure Pc in the inlet-side flow path leading to the cathode; increasing in stages the flow rate of the inert gas supplied to one of the inlet-side flow paths, the one having a larger pressure; and then increasing in stages the flow rate of the inert gas supplied to the other one of the inlet-side flow paths, the one having a smaller pressure; and terminate the purge operation by: closing the communication between the inlet-side flow path having a smaller pressure and a flow path for supplying the inert gas; and then closing the communication between the inlet-side flow path having a larger pressure and the flow path for supplying the inert gas.

2. The fuel cell system in accordance with claim 1, further comprising means for changing the internal diameter of an outlet-side flow path of an exhaust gas from said fuel cell at least in stages, and means for changing said internal diameter at least in stages based on the values of Pa and Pc during the purge operation of said fuel cell.

3. A fuel cell system comprising:

a fuel cell comprising an anode, a cathode, an inlet-side flow path leading to the anode, and an inlet-side flow path leading to the cathode;

fuel gas supply means for supplying a fuel gas to the anode;

oxidant gas supply means for supplying an oxidant gas to the cathode;

inert gas supply means for supplying an inert gas to the anode and/or cathode;

means for measuring a pressure Pa in the inlet-side flow path leading to the anode and a pressure Pc in the inlet-side flow path leading to the cathode; and a controller configured to:

variably control the flow rate of the inert gas supplied to said fuel cell based on the values of Pa and Pc during a purge operation of replacing the fuel gas and/or oxidant gas in said fuel cell with the inert gas supplied from said inert gas supply means when said fuel cell is started up or shut down, such that the relation $0 < \Delta Po \times \Delta Pp$ is always satisfied and the relation $|\Delta Pp| \leq |\Delta Po|$ is satisfied, where a differential pressure $\Delta P$ is defined as $\Delta P = Pa - Pc$, $\Delta Po$ is the differential pressure during operation, and $\Delta Pp$ is the differential pressure during the purge operation;

perform the purge operation for starting up said fuel cell by: comparing the pressure Pa in the inlet-side flow path leading to the anode and the pressure Pc in the inlet-side flow path leading to the cathode; increasing in stages the flow rate of the inert gas supplied to one of the inlet-side flow paths, the one having a larger pressure; and then increasing in stages the flow rate of the inert gas supplied to the other one of the inlet-side flow paths, the one having a smaller pressure; and terminate the purge operation by: closing the communication between the inlet-side flow path having a smaller pressure and a flow path for supplying the inert gas; and then closing the communication between the inlet-side flow path having a larger pressure and the flow path for supplying the inert gas.

* * * * *